Dec. 28, 1965     E. J. DIEBOLD     3,226,625
SERIES CONNECTION OF CONTROLLED
SEMI-CONDUCTOR RECTIFIERS
Filed Aug. 1, 1962
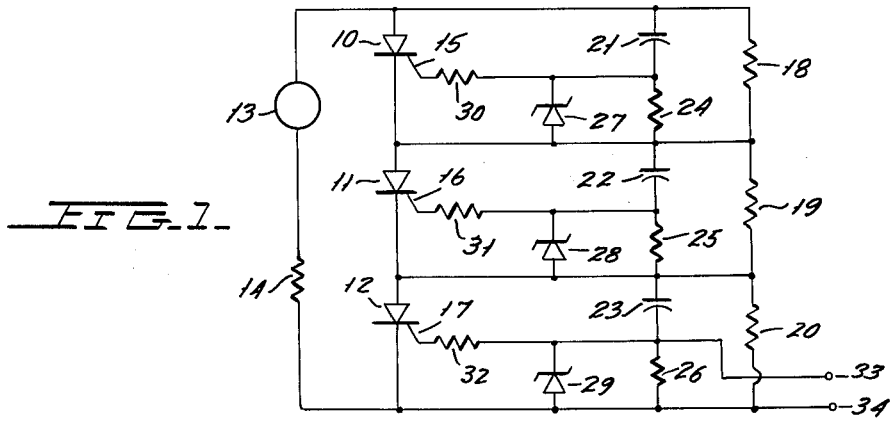
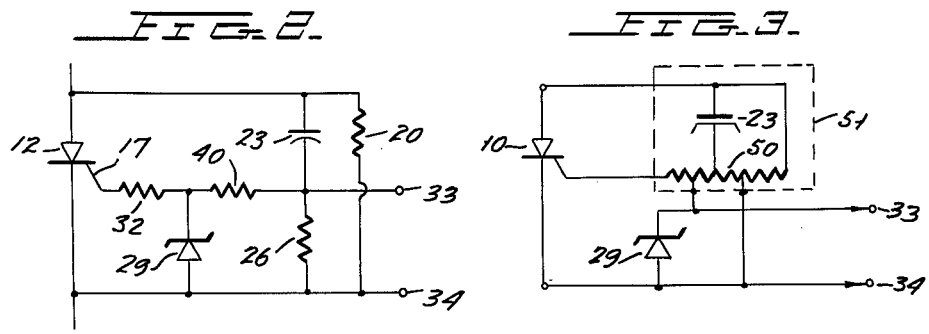
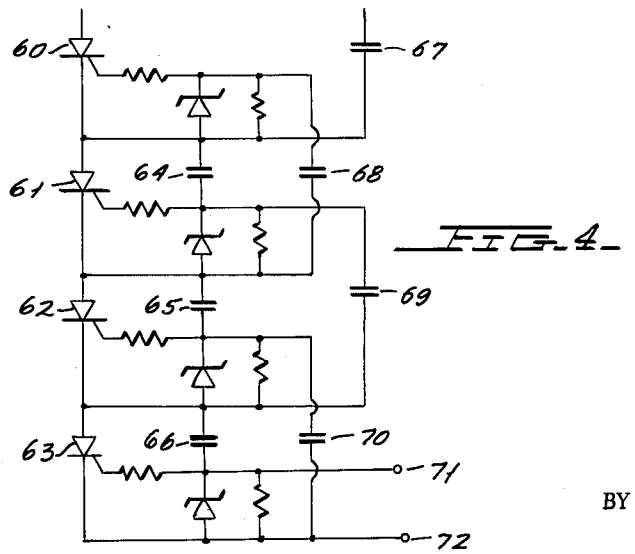
INVENTOR.
EDWARD J. DIEBOLD
BY
OSTROLENK, FABER, GERB & SOFFEN
ATTORNEYS

United States Patent Office 3,226,625
Patented Dec. 28, 1965

3,226,625
SERIES CONNECTION OF CONTROLLED SEMI-
CONDUCTOR RECTIFIERS
Edward J. Diebold, Palos Verdes, Calif., assignor to International Rectifier Corporation, El Segundo, Calif., a corporation of California
Filed Aug. 1, 1962, Ser. No. 214,003
4 Claims. (Cl. 321—27)

My invention relates to a novel voltage division and firing control circuit for a plurality of series connected controlled rectifiers.

Controlled semi-conductor rectifiers are well-known in the art and are useful in a great number of circuit applications. Where high output voltage is required, a plurality of controlled rectifiers may be connected in series.

Connecting many semi-conductor controlled rectifiers in series creates the problem of equal voltage division between the devices during the reverse blocking condition and during forward hold-off voltages. Unequal voltage division may cause breakdown of individual rectifier cells either in the reverse or in the forward direction. This is particularly the case with high voltage rectifier cells in which destructive breakdown can be experienced by excessive voltages in the reverse direction as well as the forward direction when the polarity of the gate prevents forward conduction by the normal mechanism.

Another problem consists of firing a string of controllable rectifier cells, either simultaneously or in a sequence which is in keeping with the natural voltage distribution across the cells under dynamic conditions. It is to be understood that real voltages appearing on a string of series connected devices are not simultaneous and therefore any firing system should consider the dynamic voltage unbalance.

To solve the first aspect of the problem and in accordance with the invention, voltage dividing means are added to the individual controlled rectifier cells which are connected in series. Other means, however, are required to provide the gating or firing pulse to the gate electrode of the devices.

Sudden and excessive voltage surges appearing on any one controlled rectifier cell subject the voltage dividing means to electric stresses. The present novel circuit takes advantage of these stresses to provide a firing pulse to the gate to make the device conductive in the forward direction, hence providing a discharge of the undesirable stress on the device.

Note that this system does not eliminate excessive stresses in the reverse direction, which must be protected, as any other rectifier system, from excessive surge voltages in the reverse direction. The novel system of the invention provides protection from excessive stresses on individual cells in the forward and in the reverse direction.

The inventive concept is particularly useful during the interval between the firing of the first cell in the forward direction of a string of many devices in series and current conduction through the entire string. Thus, the firing pulse, either intentional or accidental, may fire one or a plurality of individual devices in a series array. The effect of firing produces forward breakdown in particular devices which causes firing of the adjacent devices because of the increase of stress appearing on their voltage dividing means and before the devices themselves are overstressed. Thus, the firing pulse progresses through the series string, firing always the most stressed device first and delaying firing on those devices which are not subjected to stress. Thus, the procedure is inherently safe.

Accordingly, a primary object of this invention is to provide a novel circuit means for permitting the series connection of a plurality of controlled semi-conductor rectifiers.

Another object of this invention is to provide a novel firing circuit for controlling the firing of a plurality of series connected controlled semi-conductor rectifiers.

Another object of this invention is to provide a novel inexpensive voltage dividing means for controlled semi-conductor rectifiers connected in series which provides protection from excessive voltages across any individual cell in both directions of conduction.

These and other objects of my invention will become apparent from the following description when taken in connection with the drawings, in which:

FIGURE 1 illustrates a circuit in which three controlled semi-conductor rectifiers are connected in series and are provided with novel voltage division structure of the invention.

FIGURE 2 shows a modification of the circuit of FIGURE 1.

FIGURE 3 shows how the circuit of FIGURE 2 could be carried in a novel inventive package.

FIGURE 4 shows a further embodiment of the invention wherein direct capacitor coupling is employed between stages.

Referring now to FIGURE 1, I have illustrated therein three controlled semi-conductor rectifiers 10, 11 and 12 which are connected in series with an A.-C. source 13 and D.-C. source load 14. Each of the controlled rectifiers 10, 11 and 12 are provided with gate electrodes 15, 16 and 17 in the usual manner. Each of the controlled rectifiers 10, 11 and 12 are further provided with respective voltage balancing resistors 18, 19 and 20 are connected in parallel with the anode and cathode of their respective rectifiers. Resistors 18, 19 and 20 are standard types of voltages dividing resistors and provide voltage division for D.-C. voltages applied to a string of series connected rectifiers.

It will be observed that any number of series controlled rectifiers could be provided, only three being shown herein for purposes of illustrations. Each of resistors 18, 19, and 20 are electrically connected in parallel with respective series connected capacitors and resistors such as capacitors 21, 22 and 23 and resistors 24, 25 and 26. Resistors 24, 25 and 26 are then connected in parallel with a respective zener diode such as zener diodes 27, 28 and 29, respectively where the anode of each of the zener diodes is connected to the gate electrode of its respective controlled rectifier through current limiting resistors 30, 31, and 32, respectively.

An input pulse circuit is then connected directly across resistor 26 and includes terminals 33 and 34 to which a firing pulse is to be applied.

The capacitors 21, 22 and 23 serve the usual voltage division function for alternating and surge voltages applied to the series connected controlled rectifiers. The series connected resistors 24, 25 and 26 are of a relatively low ohmic value and serve to damp any possible oscillation generated by capacitors 21, 22 and 23, respectively.

More important than this, however, the resistors 24, 25 and 26 deliver firing pulses to the gates of their respective controlled rectifier. The voltage across each of the resistors 24, 25 and 26 is clamped to a relatively low value by the zener diodes 27, 28 and 29. By way of example, the zener diodes for a typical controlled rectifier will clamp the gate voltage to a value of about 5 volts. This voltage will appear across the resistors 24, 25 and 26 only when a substantial rate of change of voltage appears across the series connected capacitor and resistor such as capacitor 21 and resistor 24. By way of example, where resistor 24 is a 500 ohm resistor, a steady current of 10 milliamps is required to reach the value of 5 volts. This is equivalent to a rate of rise of voltage on capacitor 21 of 200 volts per millisecond. In applications where this voltage rise is faster, it will be apparent that the value of the resistance can be substantially reduced.

Once the appropriate firing voltage is reached, the voltage across appropriate zener diode will fire the gate circuit of its respective controlled rectifier through the current limiting resistor such as resistor 30 in the gate circuit of controlled rectifier 10.

In the circuit of FIGURE 1, the voltage division resistors 18, 19 and 20 serve several purposes. They serve the purpose of voltage division in the usual manner for D.-C. voltages. They also serve to damp their respective capacitors and serve as discharge resistors for the capacitor charge. The resistors 24, 25 and 26 also serve to reduce the discharge current of their respective capacitor and prevent oscillation between the the capacitor and its respective controlled rectifier. Moreover, the resistors limit possible short circuit currents in the event of capacitor failure.

The zener diodes 27, 28 and 29 clearly provide both forward and backward clamping for the gate circuit of their respective controlled rectifier which is necessary since both forward and backward voltages may appear on the gate and since the backward transistor effects of the controlled rectifiers can be destructive.

In order to fire the system of FIGURE 1, a positive pulse from terminals 33 and 34 is applied to resistor 26 and zener diode 29. This pulse could have been applied to any of the zener diodes in the chain beginning at either end of the chain or from the center of the chain. The appearance of this pulse could, for example, be timed to obtain appropriate voltage regulation of source 13 in the usual manner and first fires controlled rectifier 12. As soon as the controlled rectifier 12 is fired, its capacitor 23 discharges. Thus, the remaining controlled rectifiers in the series connected string will all necessarily increase their voltage to compensate for the loss of voltage across the fired controlled rectifier 12. Therefore, the charging current from capacitor 23 causes a positive voltage drop across resistors 24, 25 to cause increased voltage across the gate circuits of controlled rectifiers 10 and 11. This increased voltage across these gate circuits will be sufficient to fire both rectifiers 10 and 11, or if necessary, and depending upon the characteristics of the device, the rectifier 11 may fire first whereby additional firing voltage will be applied to resistor 24 to ultimately fire controlled rectifier 10.

Thus, regardless of the number of series connected rectifiers in the chain, it will be seen that capacitor discharge and firing of the gate circuits propagates through the string of series connected elements from one end to the other (or from the center of the string outwardly).

In addition to this, the firing of a cell occurs before the voltage increase on the controlled rectifier has time to damage the particular cell.

In a specific application of the circuit of FIGURE 1, I used silicon controlled rectifiers of the type 5RC40 manufactured by the International Rectifier Corporation, having a rated current of 5 amperes and a rated D.-C. voltage of 400 volts with an input voltage of 850 R.M.S. volts and a rated output current of 5 amperes for load 14. Resistors 18, 19 and 20 were 2,000 ohm resistors. The capacitors 21, 22 and 23 were 0.05 microfarads; resistors 24, 25 and 26 were 500 ohm resistors; the zener diodes 27, 28 and 29 were 5 volt zener diodes. The current limiting resistors 30, 31 and 32 were 50 ohm resistors.

It will be noted that circuits designed in accordance with the circuit of FIGURE 1 are entirely symmetric with no unbalance due to unequal firing circuitry. Any element of the string of series connected devices will be equally favorably or unfavorably stressed and the firing input from terminals 33 and 34 can be made to any of the elements.

A modification of the voltage dividing network of FIGURE 1 is illustrated in FIGURE 2 for the case of a single rectifier of the series connected controlled rectifiers of FIGURE 1.

More specifically, in FIGURE 2, I have illustrated controlled rectifier 12 of FIGURE 1 in connection with its circuitry wherein additional resistor 40 is connected between the anode of zener diode 29 and the junction of resistor 26 and capacitor 23. The resistor 40 will operate to prevent high surge currents from the capacitor 23 from passing through the clamping zener diode by causing the major portion of surge currents to pass through resistor 26 by appropriately proportioning the resistance of resistors 26, 32 and 40. It is to be noted that in a circuit formed with voltage division equipment as illustrated in FIGURE 2, that the voltage dividing and damping resistor such as resistor 20 could be eliminated where the resistors 26 and 40 are appropriately designed to handle problems of D.-C. voltage division and damping.

The circuit of FIGURE 2 is rearranged in FIGURE 3 to illustrate the manner in which resistors 32 and 40 and 26 and 20 can be combined as a common resistor element 50 which would lend itself to mass production techniques. Moreover, where resistor 50 is made of a single tapped resistor element, the capacitor 23 can be formed of a ceramic type capacitor with the resistor 50 and capacitor 23 carried on a common support 51, as illustrated by dotted lines.

Thus, element may be mounted in compact assemblies which could, for example, be of the type shown in my copending application Serial No. 105,729 entitled "High Voltage Rectifier Structure" in the name of Edward J. Diebold, filed April 26, 1961 and assigned to the assignee of the present invention.

As a further embodiment of the invention, and as is shown in FIGURE 4, a capacitor coupling between stages can be utilized.

In FIGURE 4, I have illustrated four controlled rectifiers 60, 61, 62 and 63 which are provided with gate current limiting resistors, clamping zener diodes, gate circuit resistors and capacitors in the same manner as in FIGURE 1.

In the circuit of FIGURE 4, however, coupling capacitors such as capacitor 64, 65, 66 are connected between stages to provide for firing of the next lower stage by drawing an upward current from the gate of the lower controlled rectifier whenever the voltage of the upper controlled rectifier collapses.

The capacitors 67, 68 and 69 and 70 provide for firing of the next upper stage by feeding an upward current from the gate of the next upward controlled rectifier whenever the voltage of the lower controlled rectifier collapses. Thus, the circuit of FIGURE 4 insures rapid firing of the controlled rectifiers by virtue of the direct capacitor coupling.

It is to be noted that the circuit of FIGURE 4 could incorporate balancing resistors such as balancing resistor 20 of FIGURE 2 and resistors such as resistor 40 of FIGURE 2.

It is also to be noted that if the capacitors 64, 65 and 66 were omitted, the firing sequence would proceed upwardly in the circuit so that triggering should be applied at the lower ends as indicated for firing terminals 71 and 72. Similarly, omitting capacitors 67, 68, 69 and 70 would provide a downwardly progressing firing so that the system would be triggered at the upper end of the chain. With both of the groups of capacitors, however, the triggering may occur at any place within the chain.

Although this invention has been described with respect to its preferred embodiments it should be understood that many variations and modifications will now be obvious to those skilled in the art, and it is preferred, therefore, that the scope of this invention be limited not by the specific disclosure herein but only by the appended claims.

I claim:

1. A control circuit for a plurality of series connected controlled rectifiers; each of said series connected controlled rectifiers having a control electrode; each of said control electrodes being connected in series with a respective control capacitor; each of said capacitors being connected in series with one another; each of said control electrodes being connected in series with a respective resistor; each of said resistors being connected in series; each of said resistors having a zener diode in parallel therewith.

2. A control circuit for a plurality of series connected controlled rectifiers; each of said series connected controlled rectifiers having a control electrode; each of said control electrodes being connected in series with a respective control capacitor; each of said capacitors being connected in series with one another; each of said control electrodes being connected in series with a respective resistor; each of said resistors being connected in series; each of said resistors and capacitors associated with a respective controlled rectifier being contained on a common support.

3. A control circuit for a plurality of series connected controlled rectifiers; each of said series connected controlled rectifiers having a control electrode; each of said control electrodes being connected in series with a respective control capacitor; each of said capacitors being connected in series with one another; each of said control electrodes being connected in series with a respective resistor; each of said resistors being connected in series; each of said resistors and capacitors being connected in a series string; each of said capacitors being in closed series relation with said control electrode and the cathode of its said respective controlled rectifier; each of said resistors being in closed series relation with said control electrode and the anode of said controlled rectifier; each of said resistors having a zener diode in parallel therewith.

4. A control circuit for a plurality of series connected controlled rectifiers; each of said series connected controlled rectifiers having a control electrode; each of said control electrodes being connected in series with a respective control capacitor; each of said capacitors being connected in series with one another; each of said control electrodes being connected in series with a respective resistor; each of said resistors being connected in series; each of said resistors and capacitors being connected in a series string and a second plurality of capacitors; each of said capacitors of said second plurality of capacitors being connected between the control electrode of first of said controlled rectifiers to the anode of adjacent controlled rectifiers.

References Cited by the Examiner

UNITED STATES PATENTS 3,158,799   11/1964   Kelley et al. _____ 307—88.5

OTHER REFERENCES

General Electric Controlled Rectifier Manual, published by General Electric Company, Semiconductors Products Department (1960), pages 74 and 75 and FIGURE 6.1 relied on.

LLOYD McCOLLUM, *Primary Examiner.*

ROBERT C. SIMS, *Examiner.*